US010411253B2

United States Patent
Tzeng et al.

(10) Patent No.: US 10,411,253 B2
(45) Date of Patent: Sep. 10, 2019

(54) COMPOSITE ELECTRODE MATERIAL AND METHOD FOR MANUFACTURING THE SAME

(71) Applicant: National Cheng Kung University, Tainan (TW)

(72) Inventors: Yonhua Tzeng, Tainan (TW); Chien-An Chen, Tainan (TW)

(73) Assignee: NATIONAL CHENG KUNG UNIVERSITY, Tainan (TW)

( * ) Notice: Subject to any disclaimer, the term of this patent is extended or adjusted under 35 U.S.C. 154(b) by 346 days.

(21) Appl. No.: 15/159,898

(22) Filed: May 20, 2016

(65) Prior Publication Data

US 2016/0344020 A1    Nov. 24, 2016

(30) Foreign Application Priority Data

May 22, 2015 (TW) .............................. 104116396 A

(51) Int. Cl.
*H01M 4/36* (2006.01)
*H01M 10/0525* (2010.01)
(Continued)

(52) U.S. Cl.
CPC ........... *H01M 4/366* (2013.01); *H01M 4/133* (2013.01); *H01M 4/134* (2013.01); *H01M 4/38* (2013.01);
(Continued)

(58) Field of Classification Search
CPC .. H01M 10/0525; H01M 4/366; H01M 4/134; H01M 4/587; H01M 4/38; H01M 4/133; H01M 4/387; H01M 4/386
See application file for complete search history.

(56) References Cited

U.S. PATENT DOCUMENTS

| 2005/0064289 A1* | 3/2005 | Suzuki ................ H01M 4/0404 429/209 |
| 2012/0064409 A1* | 3/2012 | Zhamu .................. B82Y 30/00 429/221 |

(Continued)

FOREIGN PATENT DOCUMENTS

CN    102473831 A    5/2012
WO    WO2004035197    *  4/2004

OTHER PUBLICATIONS

Lee et al., "Electrochemical Behavior of Si Nanoparticle Anode Coated with Diamond-Like Carbon for Lithium-Ion Battery," Sep. 10, 2012, Journal of the Electrochemical Society, vol. 159, pp. A1844-A1848. (Year: 2012).*

(Continued)

*Primary Examiner* — Ula C Ruddock
*Assistant Examiner* — Matthew W Van Oudenaren
(74) *Attorney, Agent, or Firm* — Bacon & Thomas, PLLC

(57) ABSTRACT

A composite electrode material and a method for manufacturing the same, a composite electrode comprising the said composite electrode material and a method for manufacturing the same, and a lithium-based battery comprising the said composite electrode are disclosed. Specifically, a composite electrode material of the present invention comprises a core or a core with a surface covered by a buffer layer, preferably a conductive diamond film, wherein a material of the core is at least one selected from the group consisting of graphite, Sn, Sb, Si, and Ge; and a graphene nano-wall layer grown from the core or the conductive diamond film covering the core.

7 Claims, 6 Drawing Sheets

(51) Int. Cl.
  *H01M 4/04*   (2006.01)
  *H01M 4/133*  (2010.01)
  *H01M 4/38*   (2006.01)
  *H01M 4/587*  (2010.01)
  *H01M 4/62*   (2006.01)
  *H01M 4/134*  (2010.01)

(52) U.S. Cl.
  CPC .......... *H01M 4/386* (2013.01); *H01M 4/387* (2013.01); *H01M 4/587* (2013.01); *H01M 10/0525* (2013.01)

(56) References Cited

U.S. PATENT DOCUMENTS

2013/0344392 A1* 12/2013 Huang .................. H01M 4/366 429/231.8

2015/0044564 A1   2/2015  Wang et al.

OTHER PUBLICATIONS

Cheng et al., "Electrically Conductive Ultrananocrystalline Diamond-Coated Natural Graphite-Copper Anode for New Long Life Lithium-Ion Battery," Mar. 24, 2014, Advanced Materials, 26, 3724-3729. (Year: 2014).*

Tzeng et al., "The synthesis of graphene nanowalls on a diamond film on a silicon substrate by direct-current plasma chemical vapor deposition," Oct. 25, 2012, Carbon, 53, 120-129. (Year: 2012).*

Yonhua Tzeng and Chien-An Chen, Electrically Conductive Diamond, Graphene and Nano Carbon Deposition on Silicon Micro-Particles as an Anode for Long Cycling Life Lithium-Ion Battery, 78 pages.

* cited by examiner

COMPOSITE ELECTRODE MATERIAL AND METHOD FOR MANUFACTURING THE SAME

CROSS REFERENCE TO RELATED APPLICATION

This application claims the benefit of the Taiwan Patent Application Serial Number 104116396, filed on May 22, 2015, the subject matter of which is incorporated herein by reference.

BACKGROUND OF THE INVENTION

1. Field of the invention

The present invention provides a composite electrode material and a method for manufacturing the same, a composite electrode comprising the said composite electrode material and a method for manufacturing the same, and a lithium-based battery comprising the composite electrode.

2. Description of Related Art

Lithium ion battery (LIB) is a widely known lithium-based battery due to its high energy storage ability. It is widely used, for example, in electric vehicles as well as in electronic and medical devices. The anode material of the common lithium ion battery is graphite. Through reversible insertion and extraction of lithium in active materials such as graphite, electrical charges are stored. Since mesocarbon microbeads (MCMB) have a theoretical capacity of 372 mAh/g (based on $LiC_6$) and have a low potential (0-0.3 V vs. $Li/Li^+$) mesocarbon microbeads are one of the common anode materials. However, the capacity of mesocarbon microbeads could not satisfy the future high energy demand.

As a result, materials which form alloys with lithium and can incorporate larger amount of lithium per unit weight, such as Sn, Sb, Si, and Ge, have thus been attractive for the replacement of graphite-based anode. Among these materials, silicon has a much higher theoretical capacity near 4200 mAh/g (ca. $Li_{4.4}Si$), which is around ten times of that for the common anode material, mesocarbon microbeads. However, as lithium ion is inserted into silicon-based anode, volume expansion of silicon-based anode of approximately 380% will occur. Repetitive expansion and contraction of silicon-based anode will cause silicon to break apart and eventually pulverize. This not only results in additional consumption of electrolyte in forming solid-electrolyte-interphase, but also leads to the loss of electrical contact between silicon particles and the current collector of a battery cell, causing rapid capacity fading during cycling. In addition, silicon has much lower electrical conductivity than the standard graphite-based anode material. Hence, suppressing the breaking of hulk silicon and maintaining good conductivity inside the battery structure are the goals for many research efforts.

Therefore, there is a need to develop a composite electrode material, which can still demonstrate good charging and discharging characteristics during multiple cycling, in order to improve the efficiency of conventional batteries that use graphite-based electrodes.

SUMMARY OF THE INVENTION

The main object of the present invention is to provide a novel composite electrode material and a method for manufacturing the same, a composite electrode comprising the said composite electrode material and a method for manufacturing the same, and a lithium-based battery comprising the said composite electrode. In particular, the novel composite electrode material and the composite electrode of the present invention are manufactured using graphene and possess a special structure. Consequently, the lithium-based battery manufactured can still demonstrate good charging and discharging characteristics and Coulombic efficiency during multiple cycling.

The present invention provides a composite electrode material, comprising: a core, wherein a material of the core is at least one selected from the group consisting of graphite, Sn, Sb, Si, and Ge; and a graphene nano-wall layer grown from the core and covered the core. In a preferred embodiment of the composite electrode material provided by the present invention, a selected buffer layer may be deposited between the core and the graphene nano-wall layer. The buffer layer is not particularly limited and may be an electrically conductive diamond film. The buffer layer can provide additional benefits to the electrode performance due to the chemical inertness and robustness in physical integrity of the buffer layer. In other words, in a preferred embodiment of the composite electrode material provided by the present invention, a surface of the core may be covered by a conductive diamond film as a buffer layer and the graphene nano-wall layer is grown from the conductive diamond film covering the core. However, the present invention is not certainly limited thereto.

The present invention also provides a manufacturing method of the aforesaid composite electrode material, comprising the following steps: providing a core, such as a pristine core, or a core preferably with a surface covered by a conductive diamond film, wherein a material of the core is at least one selected from the group consisting of graphite, Sn, Sb, Si, and Ge; and growing a graphene nano-wall layer from the core or the conductive diamond film using microwave plasma assisted chemical vapor deposition.

In the composite electrode material and the method for manufacturing the same of the present invention, the material of the core is preferably Si to maximize the charge storage capacity per volume or per weight of an electrode and to decrease the cost of the composite electrode material. The size of the core is not particularly limited as long as the size of the core is in the range of 0.05-100 μm. However, a size of the core is preferably 0.1-10 μm.

In addition, in the composite electrode material and the method for manufacturing the same of the present invention, the graphene nano-wall layer has a graphene nano-wall structure, which is a wall structure of nanoscale thickness of graphene and is approximately perpendicular to the surface of the core. The graphene nano-wall structure grows outwards from the surface of the core or the buffer layer covering the core.

Moreover, in the composite electrode material and the method for manufacturing the same of the present invention, the conductive diamond film, which serves as the buffer layer, is not particularly limited. For example, the conductive diamond film may be a nitrogen incorporated diamond film, a boron doped diamond film, or a mixture thereof. However, the conductive diamond film is preferably a nitrogen incorporated nanocrystalline diamond film. Crystalline diamond particles that made up the nitrogen incorporated diamond film or the boron doped diamond film may be made of polycrystalline diamond films containing diamond grains such as nanocrystalline diamond grains, ultrananocrystalline diamond grains, or diamond grains in mixed sizes.

In the present invention, the conductive diamond film, which serves as the buffer layer, may be manufactured by any method known in the art. For example, a plurality of diamond seeding particles may be embedded in the surface of the core first. The conductive diamond film is then grown using any method commonly used in the art next. Examples of the diamond seeding particles include nanoscale diamond particles of the size of 2-50 nm and preferably 5-10 nm manufactured by any method known in the art. When diamond seeding particles are used to manufacture the conductive diamond film, the size of the diamond seeding particles is not particularly limited as long as the size of the diamond seeding particles is in the nanometers to tens of nanometers range.

In the manufacturing method of the composite electrode material of the present invention, the microwave plasma assisted chemical vapor deposition is preferably conducted at 600-1200° C. to grow the graphene nano-wall layer from the core surface or from the conductive diamond film covering the core. The parameters of the microwave plasma assisted chemical vapor deposition are not particularly limited. The parameters of the microwave plasma assisted chemical vapor deposition may be adjusted according to the morphology and the size of the graphene nano-wall layer to be grown. The graphene nano-wall layer may also be grown using a multi-step manufacturing process selectively.

In an embodiment of the present invention, the microwave plasma assisted chemical vapor deposition used to form the composite electrode material is a two-step manufacturing process. Specifically, in the first step, a nitrogen incorporated diamond film serving as a buffer layer is formed by conducting the microwave plasma assisted chemical vapor deposition using a microwave power of 600-800 W and a gas mixture of methane, nitrogen gas, and argon gas at a gas pressure of 1-100 Torr and at a temperature of 700-950° C. for 15-60 min. In the second step, a graphene nano-wall layer is formed by continue conducting the microwave plasma assisted chemical vapor deposition of which the microwave power is increased to 800-1500 W the gas pressure is increased to 50-150 Torr, and the temperature is increased to 900-1200° C. However, the aforementioned parameters of the microwave plasma assisted chemical vapor deposition used to form the composite electrode material are only an example. The present invention is not limited thereto. The person having ordinary skill in the art may adjust the above-described parameters according to different needs.

Besides the above-mentioned composite electrode material and the method for manufacturing the same, the present invention further provides a composite electrode, comprising: a substrate with a first active material layer disposed thereon, wherein the first active material layer comprises a composite electrode material described above and a binder; and a second active material layer disposed on the first active material layer, wherein the second active material layer comprises a plurality of graphene nano-wall covered particles. Between the first and the second active material layer, a buffer layer, such as a conductive diamond film, can be deposited to further strengthen the electrode's integrity.

The present invention also further provides a manufacturing method of the aforesaid composite electrode, comprising the following steps: providing a substrate and coating a first active material on the substrate to form a first active material layer, wherein the first active material comprises a composite electrode material described above and a binder; and growing a second active material layer on the first active material layer using microwave plasma assisted chemical vapor deposition, wherein the second active material layer comprises a plurality of graphene nano-wall covered particles. In other embodiments, the second active material layer may comprise a conductive diamond film with nanoscale diamond grains, on which a growth of graphene nano-wall structure can be chosen to be carried out or chosen not to be carried out. When the growth of graphene nano-wall structure is chosen, a plurality of graphene nano-wall covered diamond particles and clusters of diamond particles are formed.

In the composite electrode and the method for manufacturing the same of the present invention, the morphology of the graphene nano-wall covered particles is not particularly limited. However, the graphene nano-wall covered particles are preferably clusters with a graphene nano-wall structure. The morphology of the graphene nano-wall structure is not particularly limited. However, the graphene nano-wall structure is preferably perpendicular to the surface of the core.

In the composite electrode and the method for manufacturing the same of the present invention, the substrate may be an electrically conductive substrate, such as a conductive metal plate. The material of the conductive metal plate is not particularly limited. For example, a material of the conductive metal plate may be a copper foil commonly used in the art.

In the composite electrode and the method for manufacturing the same of the present invention, the composite electrode material is manufactured using the aforementioned method. Thereby, its description will not be repeated here again.

In the manufacturing method of the composite electrode of the present invention, the microwave plasma assisted chemical vapor deposition is conducted at 400-700° C. to grow the second active material layer on the first active material layer. The parameters of the microwave plasma assisted chemical vapor deposition are not particularly limited. The parameters of the microwave plasma assisted chemical vapor deposition may be adjusted according to the morphology and the size of the graphene nano-wall covered particles of the second active material layer to be grown. The graphene nano-wall covered particles may also be grown using a multi-step manufacturing process selectively.

In an embodiment of the present invention, the microwave plasma assisted chemical vapor deposition used to form the graphene nano-wall covered particles of the second active material layer is a two-step manufacturing process. Specifically, in the first step, the microwave plasma assisted chemical vapor deposition is conducted using a microwave power of 600-800 W and a gas mixture of methane, nitrogen gas, and argon gas at a gas pressure of 1-100 Torr and at a temperature of 400-600° C. for 15-60 min. In the second step, the microwave plasma assisted chemical vapor deposition is conducted continuously of which the microwave power is increased to 800-1500 W the gas pressure is increased to 50-150 Torr, and the temperature is increased to 600-700° C. Through the above-described two-step manufacturing process, the graphene nano-wall covered particles of the present embodiment are formed. However, the above-mentioned parameters of the microwave plasma assisted chemical vapor deposition used to form the graphene nano-wall covered particles are only an example. The present invention is not limited thereto. The person having ordinary skill in the art may adjust the aforesaid parameters according to different needs.

Besides the aforementioned composite electrode material and the method for manufacturing the same as well as the composite electrode and the method for manufacturing the same, the present invention further provides a lithium-based battery, comprising: a composite electrode described above; a lithium counter electrode; a separator film disposed between the composite electrode and the lithium counter electrode; and an electrolyte disposed between the composite electrode and the lithium counter electrode and disposed on two sides of the separator film.

Accordingly, the composite electrode material of the present invention has a novel structure. The graphene nano-wall layer grown from the core not only maintains the structure of the core, but can further be used as an electron conduction path to enhance battery cycling life. The composite electrode manufactured using the composite electrode material of the present invention not only comprises a first active material layer with the composite electrode material, but also comprises a second active material layer with graphene nano-wall covered particles, such as graphene nano-wall covered nano-scale diamond particles. Although the composite electrode material of the present invention already enhances battery cycling life, by disposing the second active material layer, battery efficiency can be further enhanced again. Consequently, comparing to the known electrodes manufactured using graphite, when the composite electrode manufactured using non-graphite composite electrode material of the present invention is applied in a lithium-based battery, the lithium-based battery manufactured can have high battery cycling life and high capacity. The lithium-based battery manufactured can also demonstrate good charging and discharging characteristics and Coulombic efficiency during multiple cycling.

Other objects, advantages, and novel features of the present invention will become more apparent from the following detailed description when taken in conjunction with the accompanying drawings.

DETAILED DESCRIPTION OF THE PREFERRED EMBODIMENT

Manufacturing of Composite Electrode Material

Silicon micro-particles of 1-5 μm in size are mixed with a methanol diluted solution with suspended diamond nanoparticles. The diamond nanoparticles are embedded on the surface of the silicon micro-particles under ultrasonic agitation. In the present example, the diamond nanoparticles seeded silicon micro-particles serve as cores. The diamond nanoparticles serve as diamond seeding particles.

In the present example, the microwave plasma assisted chemical vapor deposition used to form the composite electrode material is a two-step manufacturing process. In the first step, a nitrogen incorporated diamond film is formed from the diamond nanoparticles by conducting the microwave plasma assisted chemical vapor deposition (i.e. microwave plasma CVD) using a microwave power of 700 W and a frequency of 2.54 GHz as well as a gas mixture of 3% methane, 20% nitrogen gas, and 77% argon gas at a gas pressure of 50 Torr for 30 min. The temperature of silicon micro-particles measured by a dual-color optical pyrometer is 788° C. In the second step, a graphene nano-wall structure is nucleated and grows upward from the nitrogen incorporated diamond film by continuing the microwave plasma assisted chemical vapor deposition of which the microwave power is increased to 1000 W and the gas pressure is increased to 90 Torr. The temperature of silicon micro-particles measured by a dual-color optical pyrometer is 1043° C. The plasma is then turned off to complete the coating process of a graphene nano-wall layer with a graphene nano-wall structure.

Figures 1A, 1B:
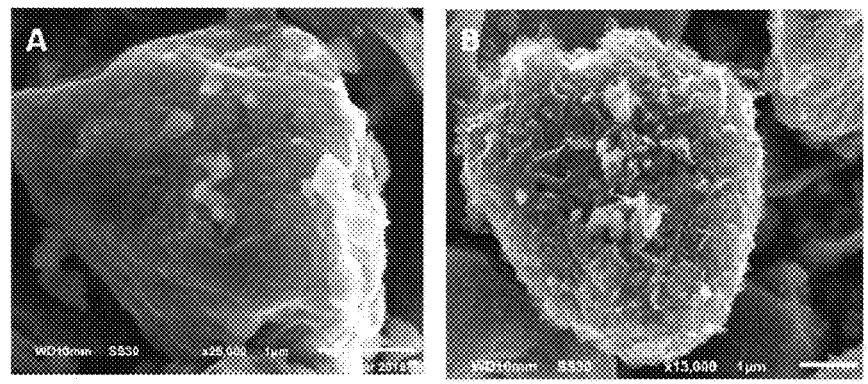
FIG. 1A is a scanning electron microscope (SEM) image of a silicon micro-particle of a preferred example of the present invention.
FIG. 1B is a SEM image of a composite electrode material of a preferred example of the present invention.
Figure 1C:
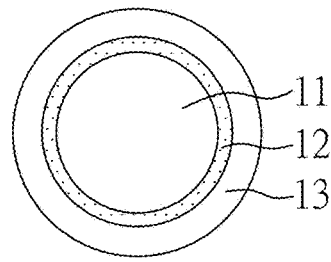
FIG. 1C is a schematic diagram showing a cross-sectional view of a composite electrode material of a preferred example of the present invention.

FIG. 1A is a SEM image of a silicon micro-particle of the present example. As shown in FIG. 1A, the diameter of the silicon micro-particle is about 5 μm. The silicon micro-particle has an irregular shape. FIG. 1B is a SEM image of a composite electrode material of the present example. FIG. 1C is a schematic diagram showing a cross-sectional view of a composite electrode material of the present example. As shown in FIGS. 1B and 1C, the composite electrode material comprises: a core 11 with a surface covered by a conductive diamond film 12, which serves as a buffer layer, wherein the core 11 is silicon micro-particle and the conductive diamond film 12 is nitrogen incorporated diamond film made up by nitrogen incorporated ultrananocrystalline diamond particles; and a graphene nano-wall layer 13 grown from the conductive diamond film 12 and covered the core 11, wherein the graphene nano-wall layer 13 has a graphene nano-wall structure.

Figure 1D:
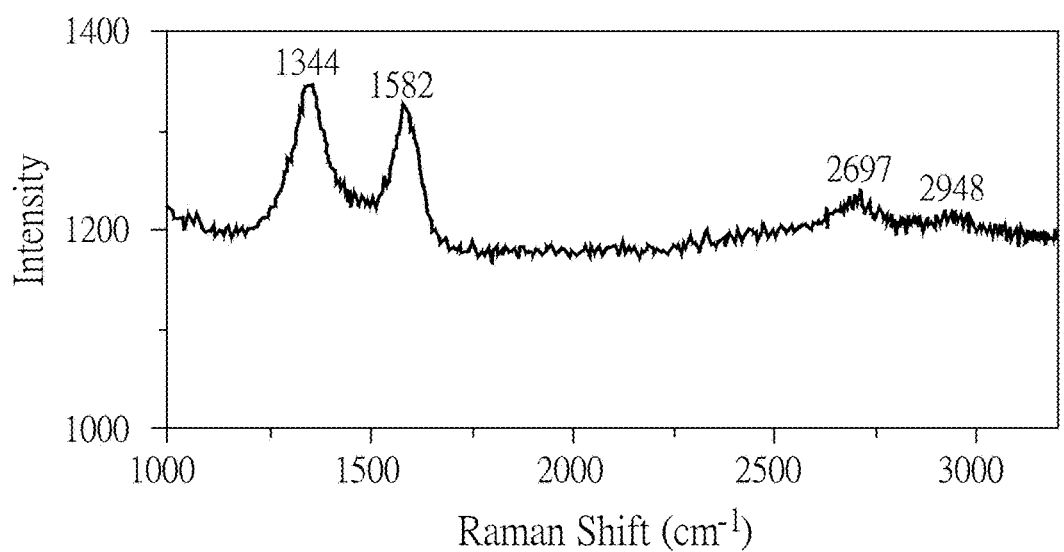
FIG. 1D is a Raman spectrum of a composite electrode material of a preferred example of the present invention.

FIG. 1D is a Raman spectrum of a composite electrode material of the present example. Besides the D band at 1344 $cm^{-1}$ and the G band at 1582 $cm^{-1}$, the 2D band at 2697 $cm^{-1}$, which is characteristic of graphene nano-wall structure, is also observed. This result verifies that the composite electrode material of the present example truly comprises a graphene nano-wall layer with a graphene nano-wall structure.

Manufacturing of Composite Electrode

Oxalic acid (0.01 g) is added in deionized water (14 g) and stirred for 5 min. Sodium carboxymethyl cellulose (NaCMC) (0.21 g, 7%) is then added followed by stirring for 30 min. Conductive carbon black Super-P (0.93 g, 31%) and the aforesaid composite electrode material (1.86 g, 62%) are added followed by stirring for 45 min to form a slurry. By means of a blade, the slurry is coated on a copper foil with a thickness of 10 μm to form a first active material layer with a thickness of 30 μm. The electrode manufactured is then baked at 60° C. overnight (12-18 hours) to remove remaining solvent. The baked electrode is then pressurized by rolling in order to increase the packaging density of the electrode.

The electrode is next placed in a microwave plasma assisted chemical vapor deposition reactor again for additional coating of graphene nano-wall structure on top of the first active material layer, serving as a second active material layer. Since the electrode comprises the copper foil and a binder (sodium carboxymethyl cellulose), the microwave plasma assisted chemical vapor deposition used to form the second active material layer is conducted at a lower temperature than that of the composite electrode material described above.

In the present example, the microwave plasma assisted chemical vapor deposition used to form graphene nano-wall covered particles of the second active material layer is a two-step manufacturing process. In the first step, the microwave plasma assisted chemical vapor deposition is conducted using a microwave power of 700 W and a frequency of 2.54 GHz as well as a gas mixture of 2% methane, 20% nitrogen gas, and 78% argon gas at a gas pressure of 50 Torr and at a substrate temperature of 540° C. for 30 min. In the second step, the microwave plasma assisted chemical vapor deposition is conducted continuously for 10 min of which the microwave power is increased to 900 W the gas pressure is increased to 80 Torr, and the substrate temperature is increased to 600° C. Through the above-described two-step manufacturing process, the second active material layer of the present embodiment is formed.

Figure 2A:
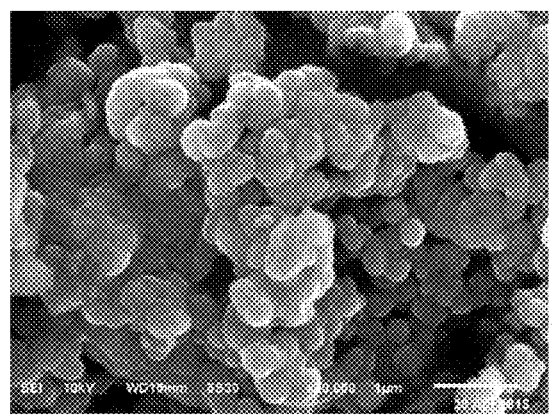
FIG. 2A is a SEM image of a second active material layer of a preferred example of the present invention.
Figure 2B:
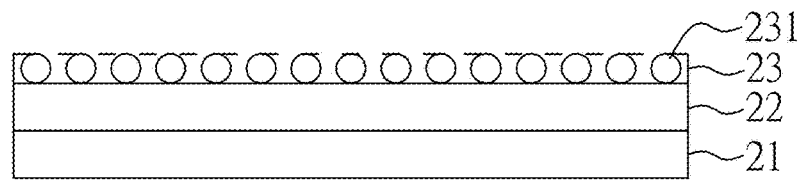
FIG. 2B is a schematic diagram showing a cross-sectional view of a composite electrode of a preferred example of the present invention.

FIG. 2A is a SEM image of a second active material layer of the present example. As shown in FIG. 2A, since the electrode comprises binder; thus, the second active material layer is made up by a plurality of ball-shaped graphene nano-wall covered particles. FIG. 2B is a schematic diagram showing a cross-sectional view of a composite electrode of the present example. As shown in FIG. 2B, the composite electrode comprises: a substrate 21 with a first active material layer 22 disposed thereon, wherein the first active material layer 22 comprises a composite electrode material described above and sodium carboxymethyl cellulose served as a binder; and a second active material layer 23 disposed on the first active material layer 21, wherein the second active material layer 23 comprises a plurality of graphene nano-wall covered particles 231. The substrate 21 is a copper foil and is a current collecting unit. The plurality of graphene nano-wall covered particles 231, as shown in FIG. 2A, are clusters with a graphene nano-wall structure.

Figure 2C:
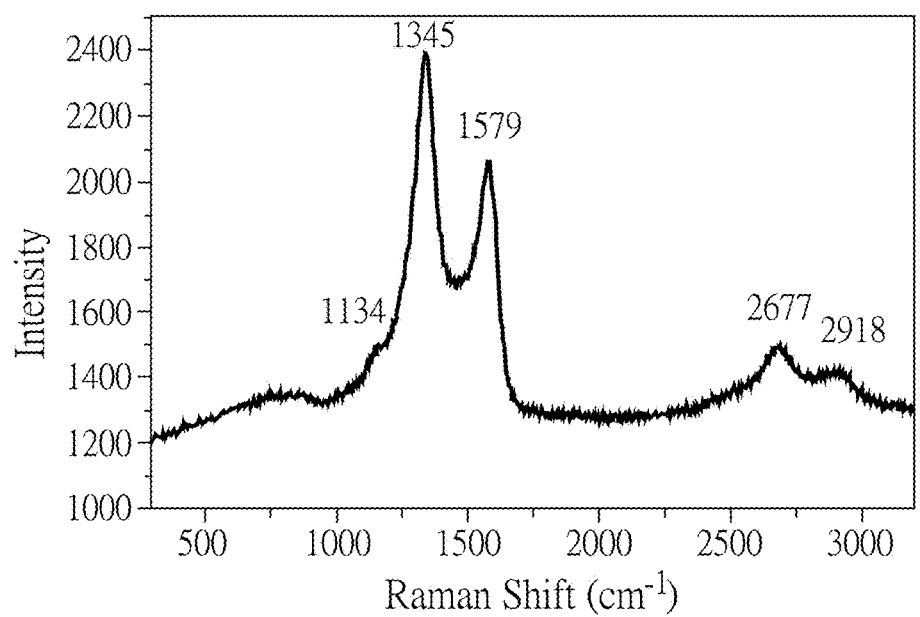
FIG. 2C is a Raman spectrum of a surface of a composite electrode of a preferred example of the present invention.

FIG. 2C is a Raman spectrum of a surface of a composite electrode of the present example. As shown in FIG. 2C, after being excited by a 532 nm laser, not only the D band at 1345 $cm^{-1}$ and the G band at 1579 $cm^{-1}$ are observed, but the 2D band at 2677 $cm^{-1}$ characteristic of graphene nano-wall structure is also observed. This result indicates that the second active material layer of the surface of the composite electrode of the present example truly comprises graphene nano-wall covered particles which are clusters with a graphene nano-wall structure. In addition, as shown in FIG. 2C, a band at 1134 $cm^{-1}$ corresponding to polyacetylene molecular chains, which mainly exist at the particle boundaries of the graphene nano-wall covered ultrananocrystalline diamond particles, is also observed.

It should be noted that the temperature and the microwave power used during the formation of the second active material layer are lower than that of the composite electrode material. As a result, the nucleation rate of the graphene nano-wall structure of the second active material layer is higher than that of the composite electrode material. The growth rate of the graphene nano-wall structure of the second active material layer is lower than that of the composite electrode material. Consequently, the graphene nano-wall covered particles of the second active material layer appear as ball-like clusters with a graphene nano-wall structure. Obvious particle boundaries are presented.

Manufacturing of Lithium-Based Half Cell

Figure 3:
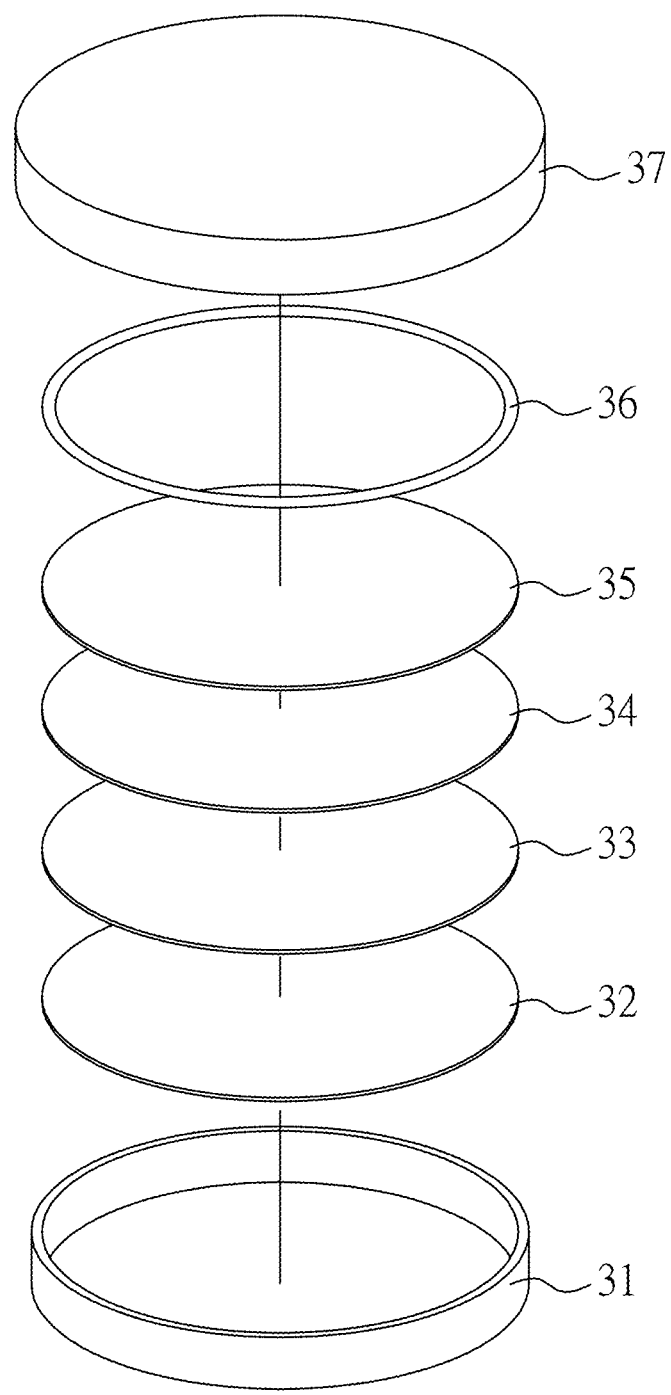
FIG. 3 is a schematic diagram of a lithium-based battery of a preferred example of the present invention.

FIG. 3 is a schematic diagram of a lithium-based battery of the present example. As shown in FIG. 3, a lithium-based half cell of the present example is formed after assembling an above-described composite electrode 34 (as anode), a can body 31, a lithium counter electrode 32 (as cathode), a separator film 33, a stainless steel spacer 35, a metal ring 36, a cap 37 (CR2032), and 1M $LiPF_6$ dissolved in EC/DEC (1:1 v/v) as an electrolyte in a glove box.

As shown in FIG. 3, a lithium-based battery of the present example comprises: a composite electrode 34 described above; a lithium counter electrode 32; a separator film 33 disposed between the composite electrode 34 and the lithium counter electrode 32; and an electrolyte (not shown) disposed between the composite electrode 34 and the lithium counter electrode 32 and disposed on two sides of the separator film 33.

A computer controlled coin cell battery testing system is used to evaluate the battery efficiency of the coin-shaped lithium-based battery manufactured. The initial three cycles are performed at a scan rate of 0.02C followed by a scan rate of 0.1C throughout evaluations. Charge and discharge capacities as well as Columbic efficiencies as a function of cycle number are recorded. Cyclic voltammetry curves are also measured to evaluate major electrochemical reactions which occurred between the electrolyte and the electrodes.

Figure 4A:
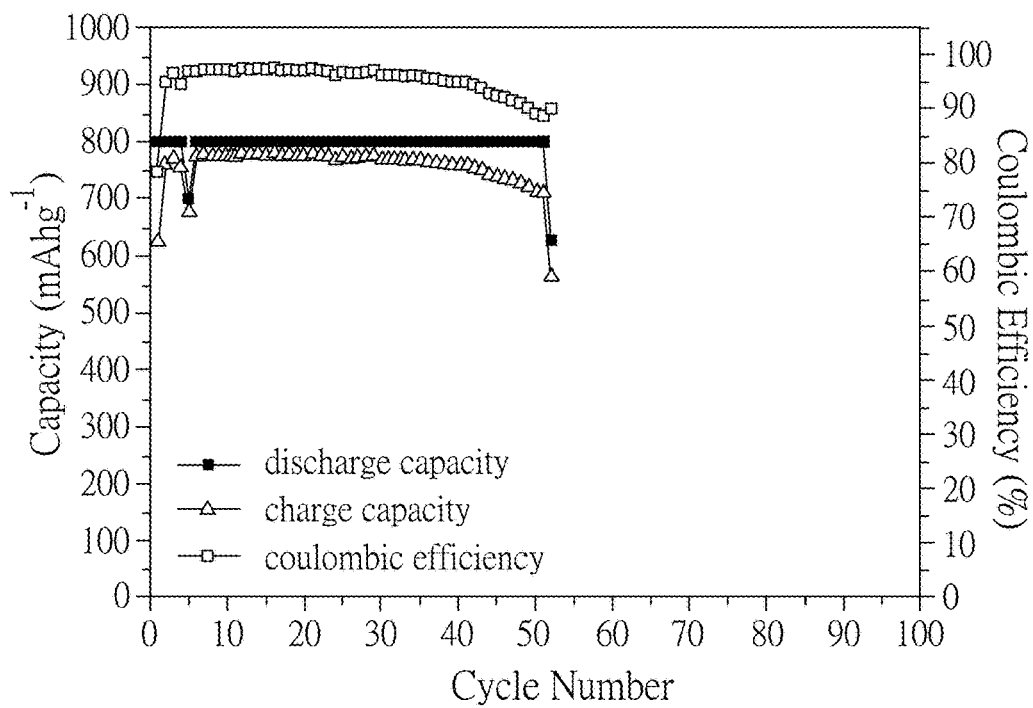
FIGS. 4A-4B respectively show the relationships of charge-discharge capacity and cycle number of silicon micro-particle electrode and composite electrode.
Figure 4B:
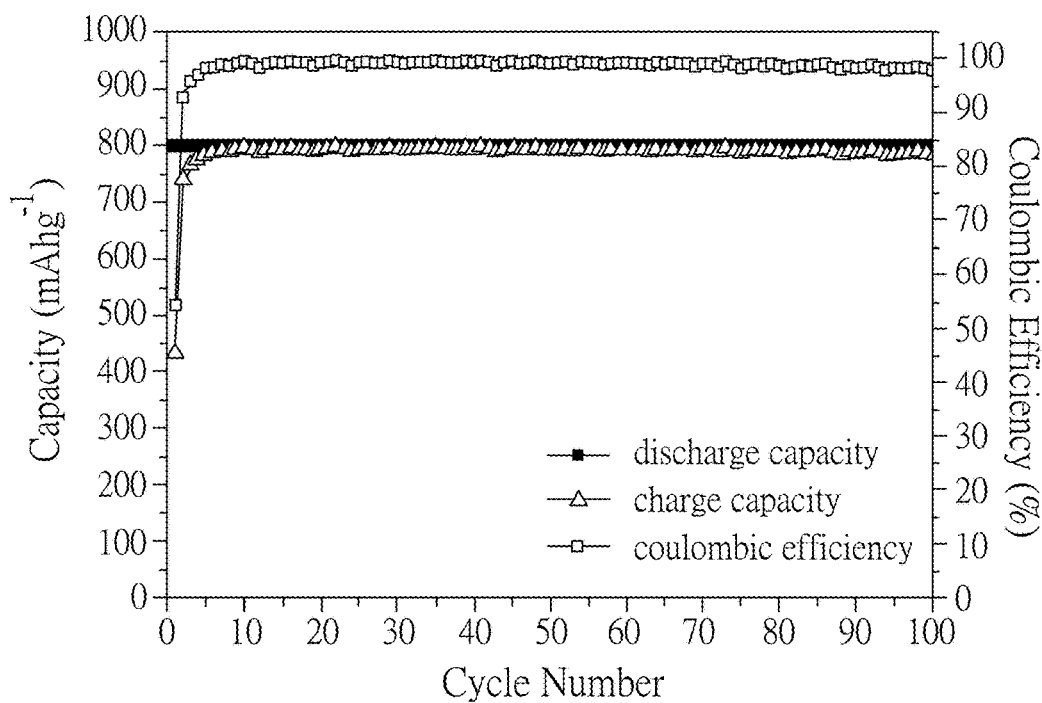

FIGS. 4A-4B respectively show the relationships of charge-discharge capacity and cycle number of silicon micro-particle electrode and composite electrode of the present invention. Here, the silicon micro-particle electrode refers to the electrode manufactured using the aforementioned manufacturing method of composite electrode without the formations of diamond film and graphene nano-wall structure by microwave plasma assisted chemical vapor deposition. Moreover, in order to evaluate the contribution of the graphene nano-wall structure to the longer battery cycling life, the maximum charging and discharging capacities are set at 800 mAh/g. The charging and discharging capacities of 800 mAh/g are lower than the theoretical maximum capacity of known silicon-based electrode but more twice of the theoretical capacity of known graphite-based electrode.

As shown in FIG. 4A, when silicon micro-particles are the active material, the charging and discharging capacities decrease rapidly after about 60 cycles of charging and discharging. Different charging and discharging capacities are observed from the beginning. The Coulombic efficiency never reaches 100% throughout the evaluation. When silicon micro-particles are used as electrodes, the volume of silicon micro-particles undergoes expansion and contraction, causing the silicon micro-particles to break apart. The breaking of silicon micro-particles decreases the electrical contact between silicon micro-particles as well as the electrical contact between silicon micro-particles and the current collecting unit. As the electrical contact between silicon micro-particles and the current collecting unit decreases, the stored lithium ions cannot release due to the charge neutrality requirement. The contribution of silicon micro-particles to the subsequent charging and discharging capacities decreases. At the same time, smaller particles resulted from the breaking of silicon micro-particles increase the overall silicon surface area, causing the electrolyte to be consumed increasingly as the formation of solid-electrolyte-interphase increases. If the consumption of the electrolyte continues, leading to very low electrolyte concentration, the electrochemical charging and discharging processes will slow down, eventually fail completely.

On the contrary, as shown in FIG. 4B, when the composite electrode of the present example is used, stable charging and discharging capabilities are observed even after 100 cycles of charging and discharging. The Coulombic efficiency remains close to 100%. Since the composite electrode of the present invention comprises a graphene nano-wall structure, the capacity is low during the first few cycles and increases subsequently, reaching the preset capacity of 800 mAh/g within a few cycles. This result indicates that the graphene nano-wall structure causes electrode to require additional cycles to be optimized. Consequently, longer cycling life is exhibited.

In other words, when the composite electrode provided by the present invention is used, the active material layer comprising the graphene nano-wall structure can retain electrical connections between neighboring and broken-apart particles of active material caused by charging and discharging. At the same time, the active material layer comprising the graphene nano-wall structure can stabilize the deposition of solid-electrolyte-interphase and decrease electrolyte consumption. As a result, battery cycling life is enhanced. Moreover, especially more pronounced at high charging and discharging capacities, it is easy for silicon-based electrode to break into smaller pieces, decreasing the electrical contact between silicon particles and the electrical contact between silicon particles and the current collecting unit. However, in the composite electrode material of the present invention, the conductive diamond film and the graphene nano-wall layer not only can be the chemically inert passivation layers of silicon particles, but the graphene nano-wall structure can further maintain the electrical contact between silicon particles. Consequently, even after silicon particles have broken apart, part of the surfaces of silicon particles can still be covered by the graphene nano-wall structure. Since the graphene nano-wall structure provides an electron conduction path, the longer cycling life of the composite electrode of the present invention can be maintained.

Figure 4C:
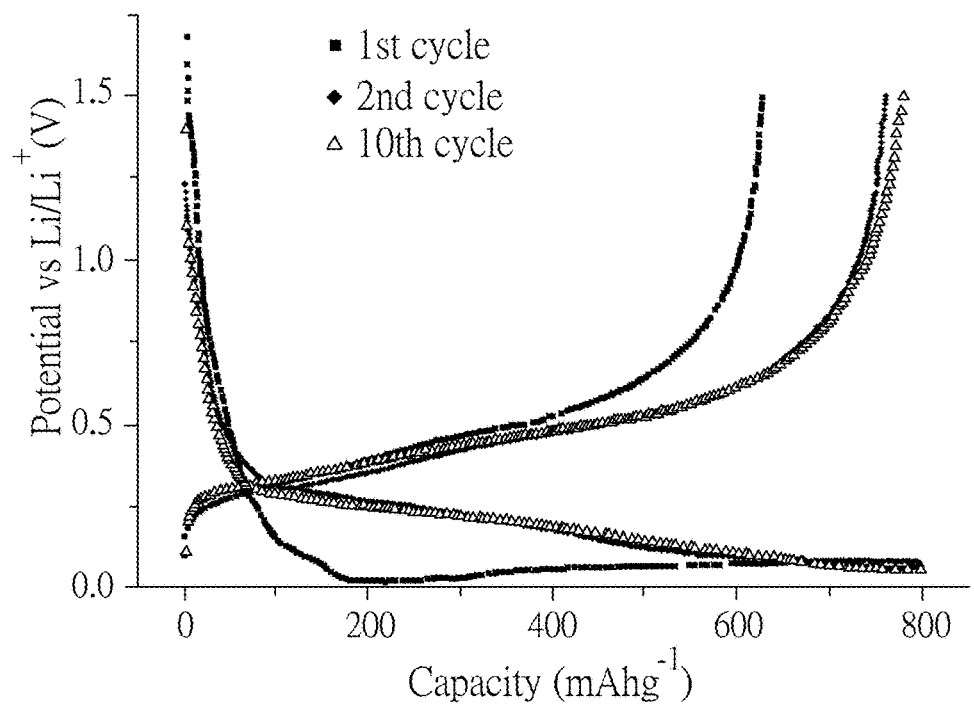
FIGS. 4C-4D respectively show the relationships of potential and capacity of silicon micro-particle electrode and composite electrode.
Figure 4D:
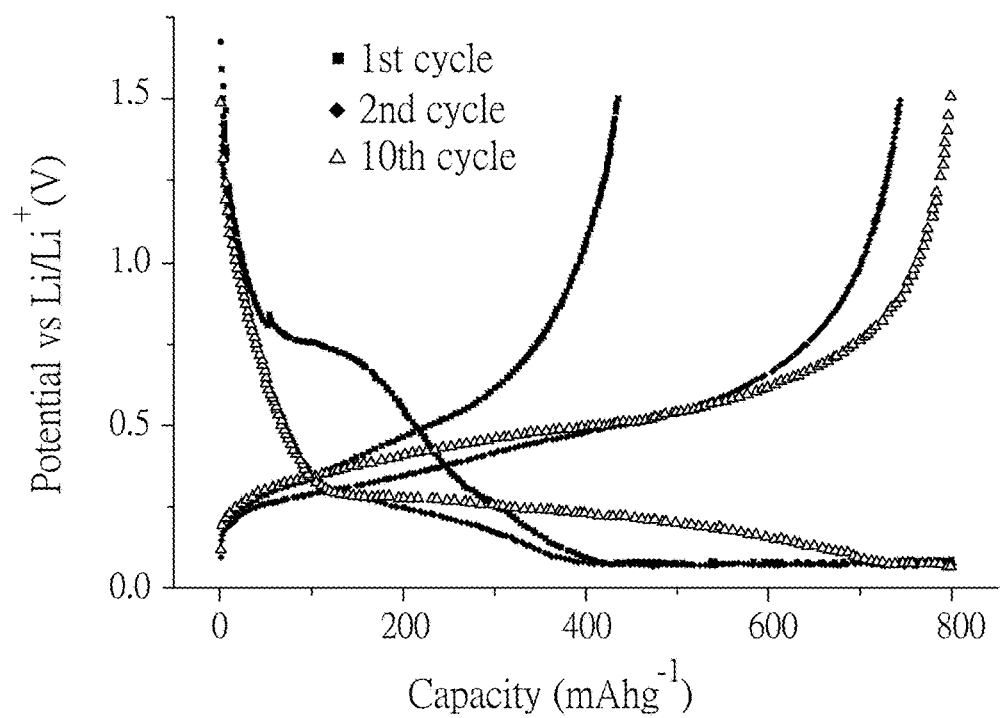

FIGS. 4C-4D respectively show the relationships of potential and capacity of silicon micro-particle electrode and composite electrode of the present invention. As shown in FIGS. 4C and 4D, the silicon micro-particle electrode discharges to 600 mAh/g capacity during the first cycle. The composite electrode of the present invention discharges only to 400 mAh/g during the first cycle. The curves for the silicon micro-particle electrode and the composite electrode of the present invention are quite different. During the third cycle, only the silicon micro-particle electrode has reached the preset discharging capacity of 800 mAh/g. A temporary potential plateau exists for the composite electrode of the present invention at 0.6 V due to the reactions between the electrolyte and the active material layer. This plateau disappears after a few cycles indicating that this is irreversible and does not affect battery operation.

Figure 5A:
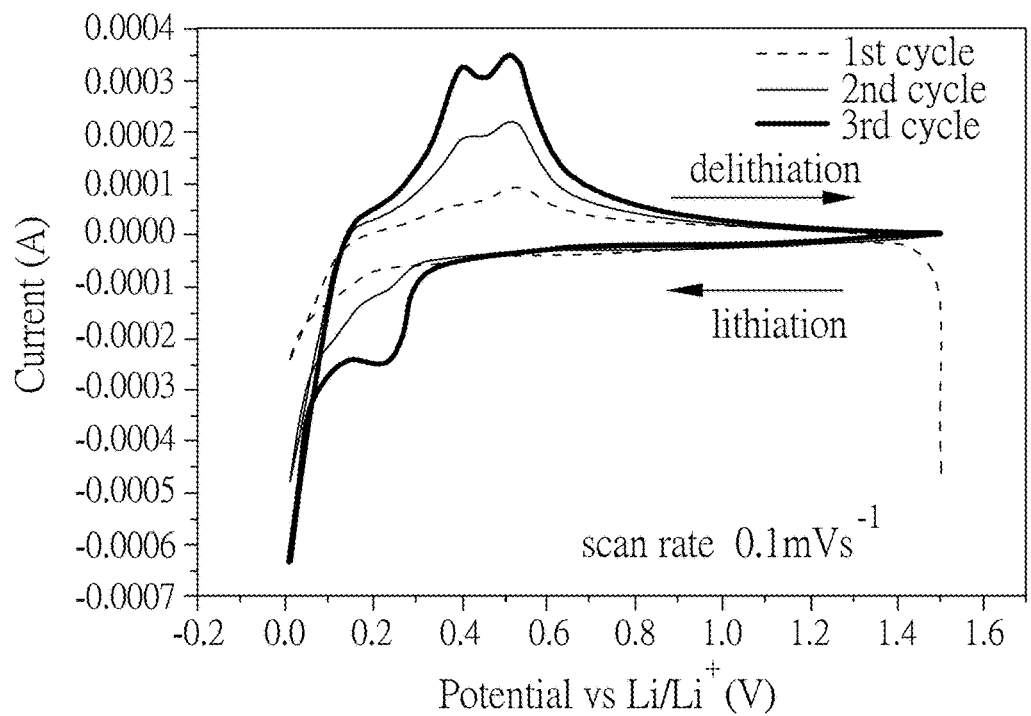
FIGS. 5A-5B respectively show the cyclic voltammetry curves of silicon micro-particle electrode and composite electrode.
Figure 5B:
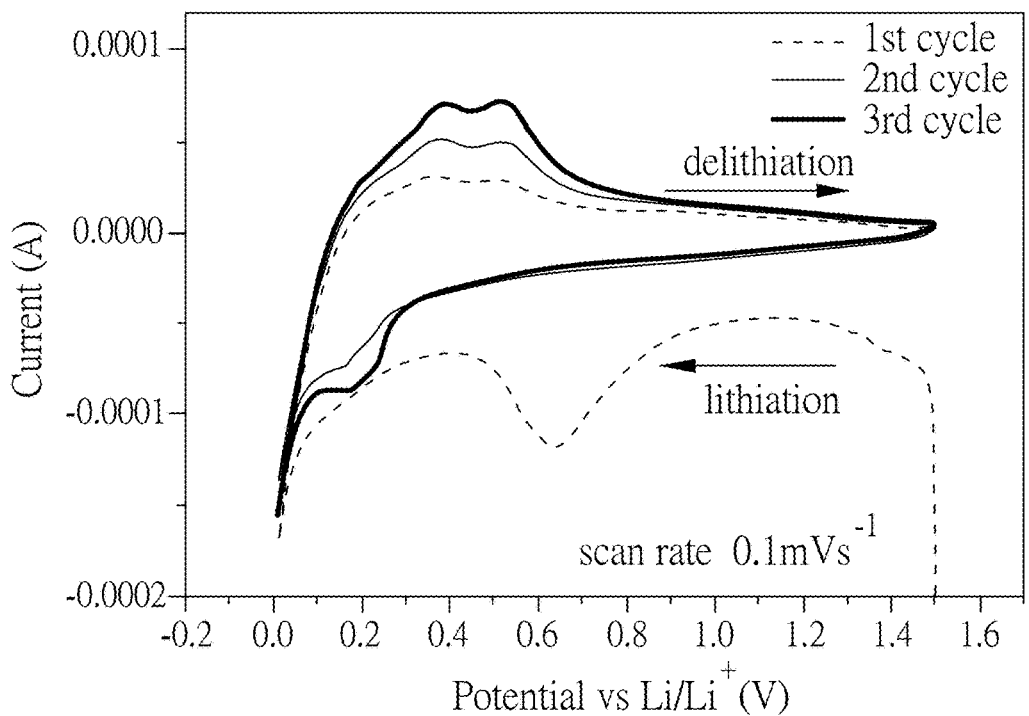

Cyclic voltammetry measurement has been performed to evaluate lithium insertion and extraction as well as other electrochemical reactions of silicon micro-particle electrode and composite electrode of the present invention. FIGS. 5A-5B respectively show the cyclic voltammetry curves of silicon micro-particle electrode and composite electrode of the present invention. As shown in FIG. 5A, the lithiation part of the cyclic voltammetry curve of the first cycle shows little signals corresponding to the formation of solid-electrolyte-interphase and electrolyte decomposition. The band at 0.2 V should be due to the formation of metastable amorphous $Li_xSi$ phases. The cathodic peak close to the cut-off potential is due to the lithiation of silicon. The two anodic peaks indicate the two-step delithiation from $Li_xSi$ to amorphous silicon. The two-step delithiation is not as obvious for the first cycle as that for the second and the third cycles. With the scan rate of 0.1 mV/s, complete lithiation can be achieved after a few cycles. As the cycle number increases, the two anodic peaks become more obvious.

On the contrary, as shown in FIG. 5B, an obvious peak is observed at 0.6 V at the initial lithiation step of the first cycle. This result is consistent with the result shown in FIG. 4D. In the composite electrode of the present invention, modifications of the graphene nano-wall structure and the diamond film are required during the initial lithiation step in order to stabilize battery and ensure long battery operation time. Since the active material layers contain various carbon phases, some reactive carbon phases will dissolve in the electrolyte while the chemically inert and electrochemically stable carbon phases will remain on the silicon cores. The signals of both the cathodic peaks and the anodic peak of the composite electrode of the present invention are much weaker than that of the silicon micro-particle electrode.

Accordingly, in the present invention, due to the formation of conductive diamond film and graphene nano-wall layer on silicon micro-particle, the cycling life of the composite electrode of the present invention can be largely increased to at least more than 100 cycles comparing to the dozens of cycles of known silicon micro-particle electrode. Especially when the composite electrode further comprises the second active material layer with graphene nano-wall covered particles, which are clusters with graphene nano-wall structure, its battery cycling life can be further enhanced comparing to that of the composite electrode comprising only the silicon micro-particle and the graphene nano-wall layer with graphene nano-wall structure. These results are due to the graphene nano-wall structure grown vertically on the diamond film. The graphene nano-wall structure not only covers the silicon micro-particles, but can further provide additional electrical contacts when the silicon micro-particles are broken to small pieces as a result of expansion and contraction. More specifically, the graphene nano-wall structure provides the electrical contacts between the silicon micro-particles as well as the electrical contacts between the silicon micro-particles and the current collecting unit. Thereby, in the present invention, although the cheaper silicon micro-particles are used as the cores of the composite electrode; however, the graphene nano-wall structure covering and growing upward from the conductive diamond film can provide a lithium-based battery with high capacity and long charging and discharging cycling life.

Although the present invention has been explained in relation to its preferred embodiments, it is to be understood that many other possible modifications and variations can be made without departing from the spirit and scope of the invention as hereinafter claimed.

What is claimed is:

1. A composite electrode material, comprising:
   a core, wherein a material of the core is at least one selected from the group consisting of graphite, Sn, Sb, Si, and Ge; and
   a graphene nano-wall layer,
   wherein a surface of the core is directly covered by a conductive diamond film as a buffer layer, the graphene nano-wall layer is disposed directly on the conductive diamond film directly covering the core, and the composite electrode material is a particle having a core/shell configuration.

2. The composite electrode material as claimed in claim 1, wherein the graphene nano-wall layer has a graphene nano-wall structure.

3. The composite electrode material as claimed in claim 1, wherein a size of the core is 0.05-100 µm.

4. The composite electrode material as claimed in claim 1, wherein the conductive diamond film is a nitrogen incorporated diamond film, a boron doped diamond film, or a mixture thereof.

5. A composite electrode, comprising:
a substrate with a first active material layer disposed thereon, wherein the first active material layer comprises a composite electrode material and a binder; and
a second active material layer disposed on the first active material layer, wherein the second active material layer comprises a plurality of graphene nano-wall covered particles and the plurality of graphene nano-wall covered particles are clusters with a graphene nano-wall structure;
wherein the composite electrode material, comprises:
a core, wherein a material of the core is at least one selected from the group consisting of graphite, Sn, Sb, Si, and Ge; and
a graphene nano-wall layer,
wherein in the composite electrode material, a surface of the core is covered by a conductive diamond film as a buffer layer and the graphene nano-wall layer is disposed directly on the conductive diamond film covering the core, and the composite electrode material is a particle having a core/shell configuration.

6. The composite electrode as claimed in claim 5, wherein the substrate is a conductive metal plate.

7. A lithium-based battery, comprising:
a composite electrode as claimed in claim 5;
a counter electrode containing lithium;
a separator film disposed between the composite electrode and the counter electrode; and
an electrolyte disposed between the composite electrode and the counter electrode and disposed on two sides of the separator film.

* * * * *